United States Patent
Machida et al.

(10) Patent No.: US 7,096,472 B2
(45) Date of Patent: Aug. 22, 2006

(54) SYSTEMS AND METHODS FOR ENSURING ATOMICITY OF PROCESSES IN A MULTITASKING COMPUTING ENVIRONMENT

(75) Inventors: Hiroyuki Machida, Kanagawa (JP); Takao Shinohara, Kanagawa (JP)

(73) Assignee: Sony Computer Entertainment Inc., (JP)

( * ) Notice: Subject to any disclaimer, the term of this patent is extended or adjusted under 35 U.S.C. 154(b) by 813 days.

(21) Appl. No.: 09/948,417

(22) Filed: Sep. 7, 2001

(65) Prior Publication Data

US 2002/0120809 A1    Aug. 29, 2002

(30) Foreign Application Priority Data

Sep. 7, 2000    (JP)    ............................ P2000-272255
Sep. 4, 2001    (JP)    ............................ P2001-268094

(51) Int. Cl.
*G06F 9/46*    (2006.01)
*G06F 13/28*    (2006.01)
*G06F 13/24*    (2006.01)
*G06F 13/36*    (2006.01)
*G06F 11/00*    (2006.01)
*G11C 29/00*    (2006.01)
*G06F 9/30*    (2006.01)

(52) U.S. Cl. ...................... 718/107; 710/22; 710/260; 710/262; 710/311; 714/10; 714/718; 714/721; 712/217

(58) Field of Classification Search ........ 718/100–108; 712/228–233, 220, 217; 711/162; 710/200, 710/260–311; 707/202; 714/718, 10
See application file for complete search history.

(56) References Cited

U.S. PATENT DOCUMENTS

| | | | | | |
|---|---|---|---|---|---|
| 4,493,020 | A | * | 1/1985 | Kim et al. | 712/217 |
| 4,654,819 | A | * | 3/1987 | Stiffler et al. | 711/162 |
| 5,307,504 | A | * | 4/1994 | Robinson et al. | 712/41 |
| 5,442,754 | A | * | 8/1995 | Datwyler et al. | 710/307 |
| 5,509,127 | A | * | 4/1996 | Datwyler et al. | 710/311 |
| 5,815,651 | A | * | 9/1998 | Litt | 714/10 |
| 5,826,084 | A | * | 10/1998 | Brooks et al. | 718/107 |
| 5,835,742 | A | * | 11/1998 | James et al. | 710/310 |
| 5,872,963 | A | * | 2/1999 | Bitar et al. | 712/233 |
| 5,937,199 | A | * | 8/1999 | Temple | 710/262 |
| 5,953,538 | A | * | 9/1999 | Duncan et al. | 710/22 |
| 6,012,120 | A | * | 1/2000 | Duncan et al. | 710/308 |
| 6,021,456 | A | * | 2/2000 | Herdeg et al. | 710/260 |
| 6,094,663 | A | * | 7/2000 | Snow et al. | 707/201 |
| 6,230,259 | B1 | * | 5/2001 | Christie et al. | 712/228 |

(Continued)

OTHER PUBLICATIONS

Lamport, "A Fast Mutual Exclusion Algorithm", ACM, 1987, pp. 1-11.*

(Continued)

*Primary Examiner*—Meng-Al T. An
*Assistant Examiner*—Jennifer N. To
(74) *Attorney, Agent, or Firm*—Lerner, David, Littenberg, Krumholz & Mentlik, LLP

(57) ABSTRACT

In the present invention, a computer in which a plurality of programs are executed under a management of an Operation System having a memory management mechanism includes a unit for ensuring atomicity of a first user process without requiring a dedicated CPU instruction. The unit for ensuring atomicity includes a unit for detecting an interrupt by a second user process, a unit for canceling the first user process by utilizing a memory protection function possessed by said Operating System, and a unit for executing an operation of the first user process again.

18 Claims, 22 Drawing Sheets

U.S. PATENT DOCUMENTS

| | | | |
|---|---|---|---|
| 6,418,460 B1* | 7/2002 | Bitar et al. | 718/108 |
| 6,466,962 B1* | 10/2002 | Bollella | 718/107 |
| 6,697,834 B1* | 2/2004 | Dice | 718/102 |
| 6,754,859 B1* | 6/2004 | Hayden et al. | 714/721 |
| 6,799,236 B1* | 9/2004 | Dice et al. | 710/200 |
| 2002/0087925 A1* | 7/2002 | Hayden et al. | 714/718 |

OTHER PUBLICATIONS

Anderson et al., "The Interaction of Architecture and Operating System Desigm", ACM, 1991, pp. 108-120.*

Massalin et al., "A Lock-Free Multiprocessor OS Kernel", Department of Computer Science, Columbia University Technical Report No. CUCS-005-91, pp. 1-19.*

Machida, H. et al., "Realization of Secure User Level Exclusive Control at PS2 Linux", Linux Conference 2001, pp. 32-36.

Bershad, B. N. et al., "Fast Mutual Exclusion for Uniprocessors", ACM Sigplan Notices, vol. 27, No. 9, Sep. 1, 1992, pp. 223-233.

Mosberger, D. et al., "Implementing Atomic Sequences on Uniprocessors Using Rollforward", Software Practice & Experience, vol. 26, No. 1, Jan. 1996, pp. 1-23.

Small, C. et al., "A Revisitation of Kernal Synchronization Schemes", Proceedings of Usenix 1997 Annual Technical Conference, Jan. 6-10, 1997, pp. 31-41.

* cited by examiner

```
int tst(addr);
tst:
        // a0 ... addr
        // v0 ... return value
        move    k1, a0              // .... (a)
        lw      v0, (a0)
        nop
        bnez    v0, 1f
        nop
        li      t0, 1               // .... (b)
        sw      t0, (k1)
1:
        j       ra
        nop
```

FIG. 8

(AN EXAMPLE OF A NON-ATOMIC "tst")

```
tst_noat:
// a0: ARGUMENT:ADDRESS OF EXCLUSIV VARIABLE
// v0: RETURN VALUE
        lw      v0, (a0)
        nop
        bnez    v0, 1f
        li      t0, 1
        sw      t0, (a0)
1:
        jr      ra
        nop
```

UserProc#1, UserProc#2 PROCEED TO CRITICAL SECTION BY EXCLUDING AS FOLLOWS.

```
while (tst_noat(mutex_var)) ;
CRITICAL SECTION
mutex_var=0;
```

FIG. 10

<SCENARIO IN WHICH TWO USER PROCESS INVADE CRITICAL SECTION SIMULTANEOUSLY>

```
UserProc#1              Kernel              UserProc#2 tst_noat:
lw      v0, (a0)
nop
bnez    v0, 1f
        (not taken)
li      t0, 1

|       Contex SW.
        +--------------+
                       |
                       +--------------->|
                                        |
                                        |
                                tst_noat:
                                lw      v0, (a0)
                                nop
                                bnez    v0, 1f
                                        (not taken)
                                li      t0, 1
                                sw      t0, (a0)

|
                                        |
                        +---------------+
                        |
        <---------------+
                Context SW
sw      t0, (a0)
```

FIG. 11

(EXAMPLE OF "test and set" THAT USES di/ei INSTRUCTION)

```
tst:
// a0: ARGUMENT:ADDRESS OF EXCLUSIV VARIABLE
// v0: RETURN VALUE
        di
        lw      v0, (a0)
        nop
        bnez    v0, 1f
        li      t0, 1
        sw      t0, (a0)
1:
        ei
        jr      ra
        nop
```

FIG. 12

<EXAMPLE OF PROGRAM FOR STOPPING SYSTEM>

```
tst_halt:
        di
        lw      v0, (a0)
        nop
        bnez    v0, 1f
        li      t0, 1
        sw      t0, (a0)
1:
        jr      ra
        nop
```

IF ONCE mutex_var BECOME 1, WHOLE SYSTEM STOPS WITH CALL SUCH AS BELOW

```
while (tst_halt(mutex_var)) ;
```

FIG. 13

<LAMPORTS ALGORITHM> i REPRESENTS A NUMBER FOR IDENTIFY PROCESS
x, y, b[i] REPRESENT VARIABLES THAT ARE SEEN FROM EACH PROCESS
<>REPRESENTS ATOMIC OPERATION

```
start:
        <b[i]=true>;
        <x=i>;

if (<y!=0>) {
                <b[i]=false>;
                await(y==0);
                goto start;
        }

<y=i>;
        if (<x!=i >) {
                <b[i]=false>;
                for (j=1; j<=N; j++) {
                        await(!b[j]);
                }
                if <y!=i> {
                        awiat(y==0);
                        goto start;
                }
        }
```

CRITICAL SECTION

```
        <y=0>;
        <b[i]=false>;
```

FIG. 14

<tst PROCEDURE PROVIDED BY SOFTWARE DEVICE DRIVER dev/tst>

```
    int tst(addr)

tst:
            // a0 ... addr
            // v0 ... return value
            move    k1,a0
            lw      v0,0(a0)
            li      t0,1
            bnez    v0,1f
            nop
            bne     k1,a0,tst
            nop
            sw      t0,0($k1)
1:
            jr      $ra
            nop
```

FIG. 17

Appendix. A
EVALUATION PROGRAM 1

```c
/* spd.c - iterate calling sem_wait() */ ifndef _REENTRANT
define _REENTRANT
endif include <sys/time.h>
include <unistd.h>
#include <stdio.h>
#include <semaphore.h>
include <pthread.h> sem_t sample_lock;
define N 10000000 int
main (int argc, char **argv)
{
        int i;
        struct timeval tm0, tm1;
        unsigned long long t;

// init
        sem_init (&sample_lock, 0, N+1);

//record start time
        gettimeofday(&tm0,NULL);

// do sem_wait()
        for (i=0; i<N; i++) {
                sem_wait(&sample_lock);
        }

//record stop time
        gettimeofday(&tm1,NULL);

tm1.tv_sec -= tm0.tv_sec;
        tm1.tv_usec -= tm0.tv_usec;
        if (tm1.tv_usec < 0) {
                tm1.tv_sec --;
                tm1.tv_usec += 1000000;
        }
        t = tm1.tv_sec * 1000 *1000 + tm1.tv_usec;
        t *= 1000;
        t /= N;
        printf("%lld nsec\n",t);

return 0;
```

FIG. 18

Appendix. B
EVALUATION PROGRAM 2

```c
/* tst.c         simple producer/consumer problem */ ifndef _REENTRANT
define _REENTRANT
endif include <stdlib.h>
include <sys/time.h>
#include <stdarg.h>
#include <stdio.h>
#include <semaphore.h>
include <pthread.h>
include <signal.h> typedef struct {
        int id;
        char str[10];
} my_buff_t;

my_buff_t buffer[8000];
const int buff_size = sizeof(buffer)/sizeof(buffer[0]);

volatile int out_index=0;
volatile int in_index=0;

volatile int num_consumer=1;
volatile int num_producer=1;

volatile long long consumed = 0ll;
volatile long long produced = 0ll;

volatile int stop =1;

struct th {
        pthread_t id;
        long long stat;
};
struct th *co;
struct th *pr;

sem_t consumer_lock;
sem_t producer_lock;
sem_t num_fulls;
sem_t num_empties;

int debug=0;

int msgout(char *fmt, ...)
{
        va_list args;
        char buffer[2000];
        va_start (args, fmt);
        if (debug)
                vsprintf(buffer,fmt, args);
        va_end (args);
} void
term_parent(int sig)
{
```

FIG. 19

```
                stop = 1;
        }
void
init_commons(void)
{
        sem_init (&num_fulls, 0, 0);
        sem_init (&num_empties, 0, buff_size);
        sem_init (&consumer_lock, 0, 1);
        sem_init (&producer_lock, 0, 1);
} void
destroy_commons(void)
{
        sem_destroy (&num_fulls);
        sem_destroy (&num_empties);
        sem_destroy (&consumer_lock);
        sem_destroy (&producer_lock);
} int alarm_time=0;

void
init_opt(int argc, char **argv)
{
        extern char *optarg;
        extern int optind;

int ch;
        int i;

while ((ch = getopt(argc, argv, "t:c:p:")) != -1)
                switch(ch) {
                  case 'c':
                        i=(atoi(optarg));
                        if (i>0) num_consumer=i;
                        break;
                  case 'p':
                        i=(atoi(optarg));
                        if (i>0) num_producer=i;
                        break;
                  case 't':
                        alarm_time = (atoi(optarg));
                        break;
                  default:
                        printf ("unkown option or invalid arg\n");
                        exit(1);
                }
        argc -= optind;
        argv += optind;

// allocate thread data
        co = calloc(num_consumer, sizeof(co[0]));
        pr = calloc(num_producer, sizeof(pr[0]));

if (!co || !pr ) {
                perror("calloc");
                exit(1);
        }

// show parameters
        printf("alarm:%d\n", alarm_time);
        printf("# of producer:%d\n", num_producer);
        printf("# of consumer:%d\n", num_consumer);
        fflush(stdout);
```

FIG. 20

```
} void
consumer(int i)
{
        my_buff_t my_buffer;
        sigset_t sigset;

// init
        sigemptyset(&sigset);
        sigaddset(&sigset, SIGALRM);
        pthread_sigmask(SIG_BLOCK, &sigset, NULL);
        while (stop) {
                usleep(1);
        } while (1) {
                int k=0;
                // get a backet from common buffer
        retry:
                // Do I have any filled item?
                sem_wait(&num_fulls);
                // Is any other consumer in progress?
                if (sem_trywait(&consumer_lock)) {
                        sem_post(&num_fulls);
                        if (k==0) {
                                msgout("c:%2d:retry\n",i);
                                k++;
                        }
                        usleep(1);
                        goto retry;
                } msgout("c:%2d:enter\n",i);
                memcpy(&my_buffer,
                        &(buffer[out_index]),
                        sizeof(buffer[0]));

// sanity check
                if (out_index != my_buffer.id) {
                        printf("ERROR:consumer:%d\n" , i);
                } msgout("%2d:GET:[%3d]:0x%2.2x(%3d)\n , i, out_index,
                        my_buffer, my_buffer);

// update index
                out_index ++;
                if (out_index >= buff_size )
                        out_index = 0;
                // update stats
                consumed ++;
                co[i].stat ++;

sem_post(&num_empties);
                sem_post(&consumer_lock);
                msgout("c:%2d:leave\n",i);

// consume bucket
                        ;

// release proceesor
                sched_yield();
```

FIG. 21

```
        }
} void
producer(int i)
{
        my_buff_t my_buffer;
        sigset_t sigset;

sigemptyset(&sigset);
        sigaddset(&sigset, SIGALRM);
        pthread_sigmask(SIG_BLOCK, &sigset, NULL);
        while (stop){
                usleep(1);
        } while (1) {
                // init retry count
                int k=0;

// prepare bucket
                        ;

// put it to common buffer
                retry:
                // Do I have any empty space?
                sem_wait(&num_empties);
                // Is any other producer in progress?
                if (sem_trywait(&producer_lock)) {
                        sem_post(&num_empties);
                        if (k==0) {
                                msgout("p:%2d:retry\n",i);
                                k++;
                        }
                        usleep(1);
                        goto retry;
                }
                msgout("p:%2d:enter\n",i);

//  for debug
                my_buffer.id = in_index;

memcpy(&(buffer[in_index]),
                        &my_buffer,
                        sizeof(buffer[0]));
                msgout("%2d:PUT:[%3d]:0x%2.2x(%3d)\n", i, in_index,
                        my_buffer, my_buffer);

// update index
                in_index++;
                if (in_index >= buff_size )
                        in_index = 0;

// update stats.
                produced++;
                pr[i].stat ++;

sem_post(&num_fulls);
                sem_post(&producer_lock);
                msgout("p:%2d:leave\n",i);

// release processor
                sched_yield();
        }
}
```

FIG. 22

```c
int
main (int argc,char **argv)
{
        int i;
        struct sigaction term_act;
        sigset_t maskset;
        int r;
        struct itimerval itm_val={{01,01},{01,01}};

init_opt (argc,argv);
        init_commons();

// set signal handlers
        sigfillset(&term_act.sa_mask);
        term_act.sa_handler = term_parent;
        sigaction (SIGINT, &term_act, NULL);
        sigaction (SIGALRM, &term_act, NULL);

// create consumers
        for (i=0;i<num_consumer; i++) {
                r=pthread_create (&co[i].id, NULL,
                        (void *) consumer, (void *)i/*arg*/);
                if (r) {
                        perror("pthread_create");
                        exit(1);
                }
        }
        // create producers
        for (i=0;i<num_producer; i++) {
                r=pthread_create (&pr[i].id, NULL,
                        (void *) producer, (void *)i/*arg*/);
                if (r) {
                        perror("pthread_create");
                        exit(1);
                }
        }

// start timer, if needed
        if (alarm_time>0) {
                itm_val.it_value.tv_sec = alarm_time;
                setitimer(ITIMER_REAL, &itm_val, NULL);
        }

// start
        printf ("start\n"); fflush(stdout);
        stop = 0;

// wait until alarmed or ^C
        while(!stop)
                usleep(1);

// kill children
        pthread_kill_other_threads_np();

// show results
        printf ("consumed:%lld\n", consumed);
        printf ("produced:%lld\n", produced);

destroy_commons();

return 0;

SYSTEMS AND METHODS FOR ENSURING ATOMICITY OF PROCESSES IN A MULTITASKING COMPUTING ENVIRONMENT

CROSS-REFERENCE TO RELATED APPLICATIONS

The present application claims priority from Japanese Application No. P2000-272255 filed Sep. 7, 2000 and Japanese Application No. P2001-268094 filed Sep. 4, 2001, the disclosures of which are hereby incorporated by reference herein.

BACKGROUND OF THE INVENTION

The present invention relates to a computer, a method of controlling the computer, and a recording medium into which the method of controlling is recorded.

Generally speaking, for computers, single-processor single-task systems for executing a single job (user program) with a single processing device, single-processor multitask systems for executing a plurality of jobs with a single processor, and, multiprocessor multitask systems for executing a plurality of jobs with a plurality of processing devices are known.

Among these, the multiprocessor system has a plurality of processors which process the plurality of jobs in parallel and independently.

On one hand, in the single-processor multitask system, usually, the plurality of jobs (user programs) are seemingly executed simultaneously.

However, problems such as a race condition concerning monopolization of computer resources may occur because there are a plurality of jobs to be processed although there is only a single processor.

In the computer described above, a plurality of user programs are processed in a time-sharing manner while avoiding the race condition under the control of an OS (Operating System), which is a basic software.

In the single processor system described above, a dedicated instruction for efficiently and safely executing exclusive control at the user process level may be provided in some cases. However, there are many cases where such dedicated instructions are not provided, depending on the kind of processor. In such cases, there is no means for efficiently and safely executing exclusive control at the user process level.

SUMMARY OF THE INVENTION

Accordingly, in view of the above described problem, it is an object of the present invention to provide, in a single-processor system for processing multiple jobs, a novel computer for efficiently and safely executing exclusive control at the user process level, without any dedicated instruction, a method of controlling the computer, and a recording medium onto which the method of controlling the computer is recorded.

The computer according to the present invention is a computer, in which a plurality of programs are operated under the management of an Operating System (OS) having a memory management mechanism, and includes a unit for ensuring atomicity of a first user process, without requiring a dedicated CPU (Central Processing Unit) instruction.

Preferably, in the computer according to the present invention, the unit for ensuring atomicity includes a unit for detecting an interrupt or preemption by a second user process, and a unit for canceling the operations of the first user process by utilizing a memory protection function possessed by the OS.

More preferably, in the computer according to the present invention, the unit for ensuring atomicity further includes a unit for executing the first user process again.

More preferably, in the computer according to the present invention, the unit for detecting an interrupt detects an interrupt by the second user process by using a kernel of the OS.

In the computer according to the present invention, it is preferable that the unit for canceling includes a unit for writing an address for temporarily writing the first user process into a predetermined register, and a unit for rewriting the contents of the predetermined register to a predetermined constant when there is an interrupt from the second user process.

In the computer according to the present invention, the unit for canceling further preferably includes a unit for setting the first user process as an error when the kernel detects the predetermined constant.

In the computer according to the present invention, the predetermined register is preferably a work register of the kernel.

Preferably, in the computer according to the present invention, the predetermined constant is an invalid address.

In the computer according to the present invention, the computer preferably includes a CPU in which the work register of the kernel can be also utilized by the user processes.

The above-mentioned object of the present invention can be achieved by a method of controlling a computer in which a plurality of programs are operated under the management of an Operating System (OS) having a memory management mechanism. The method includes the steps of detecting an interrupt of a second user process, and canceling a first user process by utilizing a memory protection function possessed by the OS, thus ensuring atomicity of the first user process.

Preferably, the method of controlling a computer according to the present invention further includes the steps of executing the first user process again, thus ensuring atomicity of the first user process.

More preferably, in the method of controlling a computer according to the present invention, the step of detecting the interrupt detects an interrupt of the second user process by using a kernel of the OS.

More preferably, in the method of controlling a computer according to the present invention, the step of canceling includes the steps of writing an address for temporarily writing the first user process into a predetermined register, and rewriting a content of the predetermined register to a predetermined constant when there is an interrupt from the second user process.

Preferably, in the method of controlling a computer according to the present invention, the step of canceling further includes the step of setting the first user process as an error when the kernel detects the predetermined constant.

Preferably, in the method of controlling a computer according to the present invention, the predetermined register is a work register of the kernel.

Preferably, in the method of controlling a computer according to the present invention, the predetermined constant is an invalid address.

In the method of controlling a computer according to the present invention, the computer preferably includes a CPU in which the work register of the kernel can be also utilized by the user processes.

The above-mentioned object of the present invention also can be achieved by a recording medium onto which a program for controlling a computer in which a plurality of programs are operated under the management of an Operating System (OS) having a memory management mechanism is recorded. The program includes the steps of detecting an interrupt by a second user process, and canceling an operation of a first user process by utilizing a memory protection function possessed by the OS, thus ensuring atomicity of the first user process.

Preferably, in the recording medium according to the present invention, the program further includes the step of executing the operation of the first user process again.

More preferably, in the recording medium according to the present invention, the step of detecting the interrupt by the second user process detects an interrupt by the second user process by using a kernel of the OS.

In the recording medium according to the present invention, the step of canceling preferably includes the steps of writing an address for temporarily writing the first user process into a predetermined register, and rewriting the contents of the predetermined register to a predetermined constant when there is an interrupt by the second user process.

Preferably, in the recording medium according to the present invention, the step of canceling further includes the step of setting the first user process as an error when the kernel detects the predetermined constant.

In the recording medium according to the present invention, the predetermined register is preferably a work register of the kernel.

Preferably, in the recording medium according to the present invention, the predetermined constant is an invalid address.

In the recording medium according to the present invention, it is preferable that the computer includes a CPU in which the work register of the kernel can also be utilized by the user processes.

Further objects and advantages of the invention can be more fully understood from the following detailed description taken in conjunction with the accompanying drawings.

BRIEF DESCRIPTION OF THE DRAWINGS

FIG. 8 is a diagram showing an example of a processing program;

FIG. 10 is a diagram showing a program which is not implemented atomicityally;

FIG. 11 is a sequence diagram showing a penetration into a critical section;

FIG. 12 is a diagram showing a program in which a di/ei instruction is used;

FIG. 13 is a diagram showing a program for stopping the system;

FIG. 14 is a diagram showing Lamport's algorithm;

FIG. 17 is a diagram showing a test-and-set instruction tst procedure provided by a software device driver dev/tst;

FIG. 18 is a diagram showing an evaluation program 1;

FIG. 19 is a first diagram of an evaluation program 2;

FIG. 20 is a second diagram of the evaluation program 2;

FIG. 21 is a third diagram of the evaluation program 2;

FIG. 22 is a fourth diagram of the evaluation program 2; and

FIG. 23 is a fifth diagram of the evaluation program 2.

DETAILED DESCRIPTION

In the following, the preferred embodiments of the present invention will be described in detail with reference to the accompanying drawings.

Firstly, a computer which is used when the present invention is implemented will be described.

Figure 1:
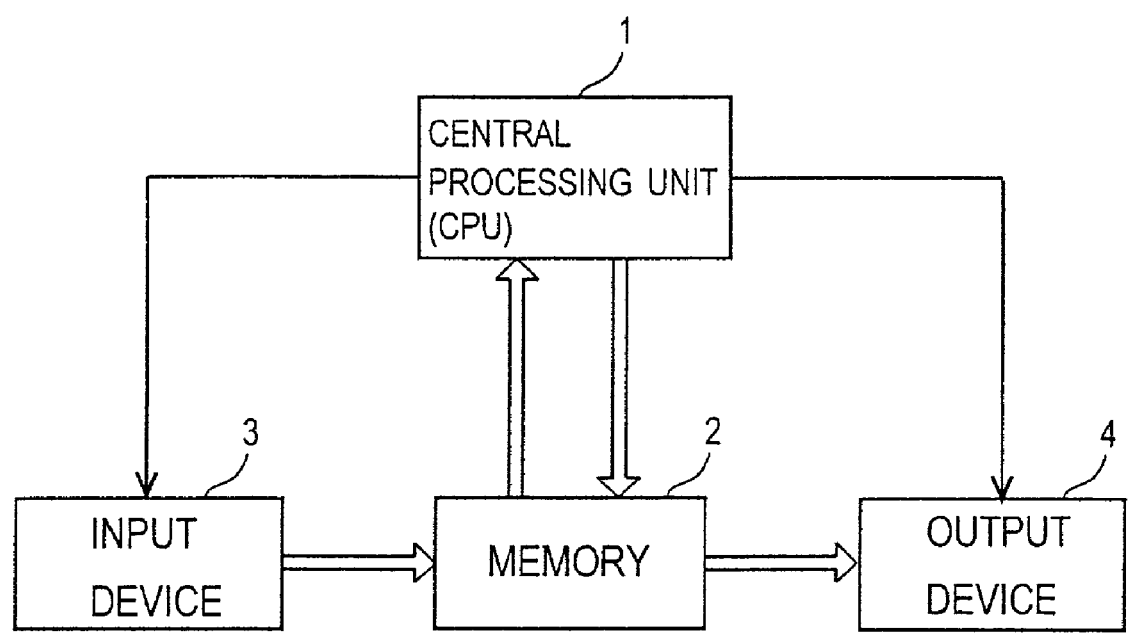
FIG. 1 is a block diagram showing an example of a computer according to the present invention.

As shown in FIG. 1, the computer which is used when the present invention is implemented includes at least a CPU (Central Processing Unit) 1, a memory 2, an input device 3, and an output device 4. Here, the CPU 1 includes at least capabilities of a privileged mode (also referred to as a "kernel mode") and a non-privileged mode (also referred to as a "user mode"), and a memory management mechanism (a translation or conversion function from a logical address to a physical address, a memory protection function, and the like).

In an implementation of an Operating System (OS) to be described below, the "privileged mode" indicates a state in which a computer is being operated with a control operation (a control instruction, a privileged instruction) of a special hardware resource that cannot be used by a common user program.

"Memory management mechanism" indicates a mechanism for managing the memory 2, and includes an address translation function, a memory protection function, and the like. The address conversion function implements a mapping between a logical address space and a physical address space. The memory protection function is, for example, a function for implementing error detection in the case where a user erroneously accesses a system area during execution, in order to prevent the user from using an area that is being used by the OS, by dividing the memory area in advance to define a system area (for use by the OS) and a user area (for use by the user). For this reason, the memory protection function sets attributes for each memory area, such as whether it is executable or not, whether it is writable or not, and so on.

Figure 2:
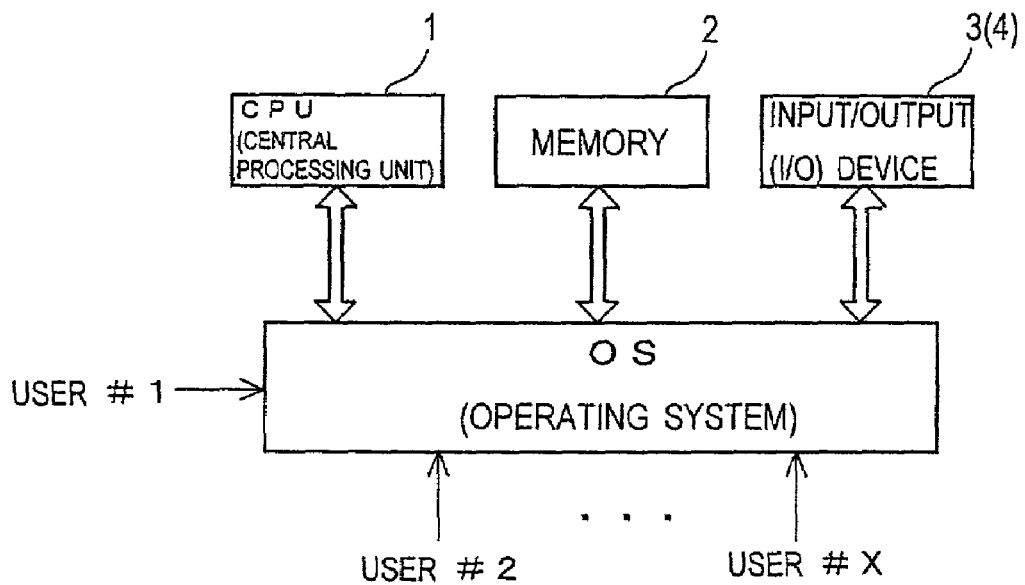
FIG. 2 is a schematic diagram showing an Operating System (OS) according to the present invention.

In the following, the OS (Operating System) 5 to be used in the above-mentioned computer will be described. As shown in FIG. 2, the OS 5 is a basic software which includes a kernel 6, a user interface, and the like, and executes program reading/execution, and management of computer resources such as a HDD (Hard Disk Drive), memory, external peripheral devices and the like. The OS 5, which is the subject of the present invention, includes a function for executing multiple processes and a memory protection function of inter-processes by preemptive scheduling. Preemptive scheduling means that, when determining what user process it should run (select and execute) next time, each user process executes a switching (context switching) not only actively, but also passively using a timer interrupt and the like.

Figure 3:
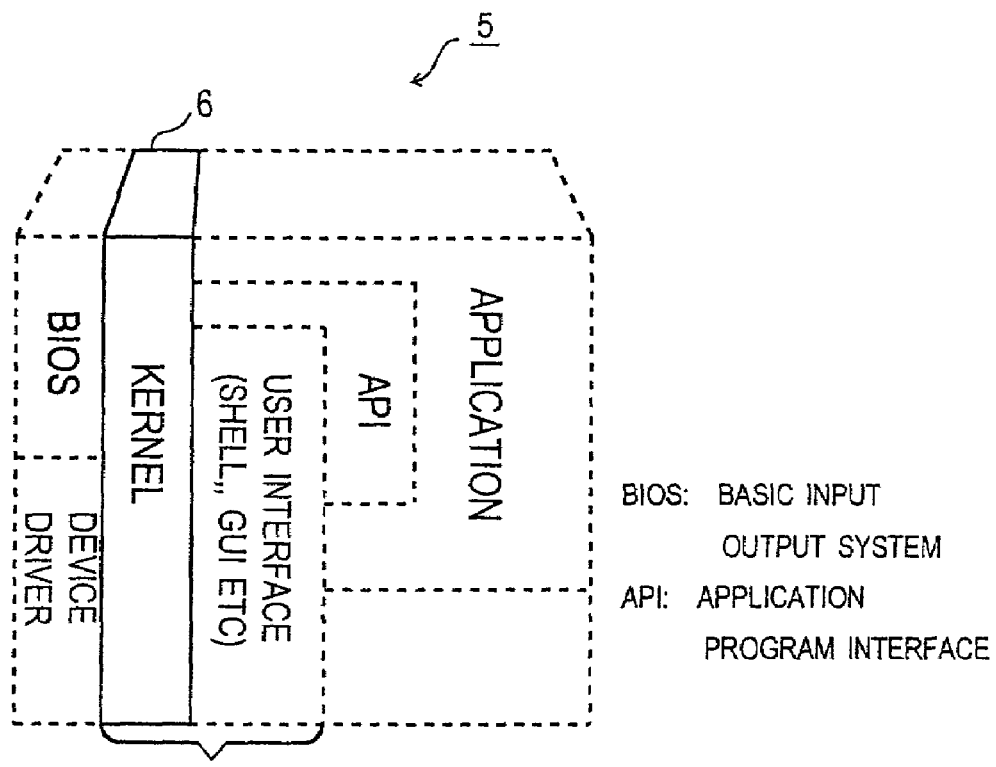
FIG. 3 is a schematic diagram for illustrating simultaneous sharing of a computer resource.
Figure 4:
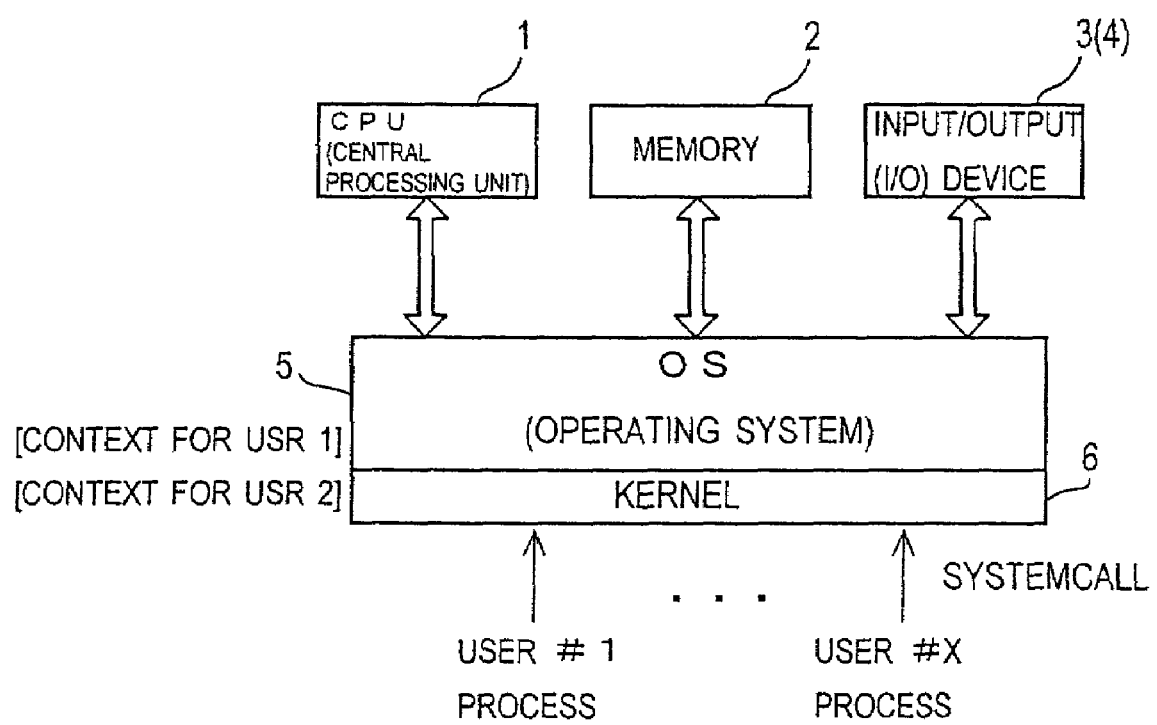
FIG. 4 is a diagram for illustrating a relationship between a user process and the kernel.
Figure 5:
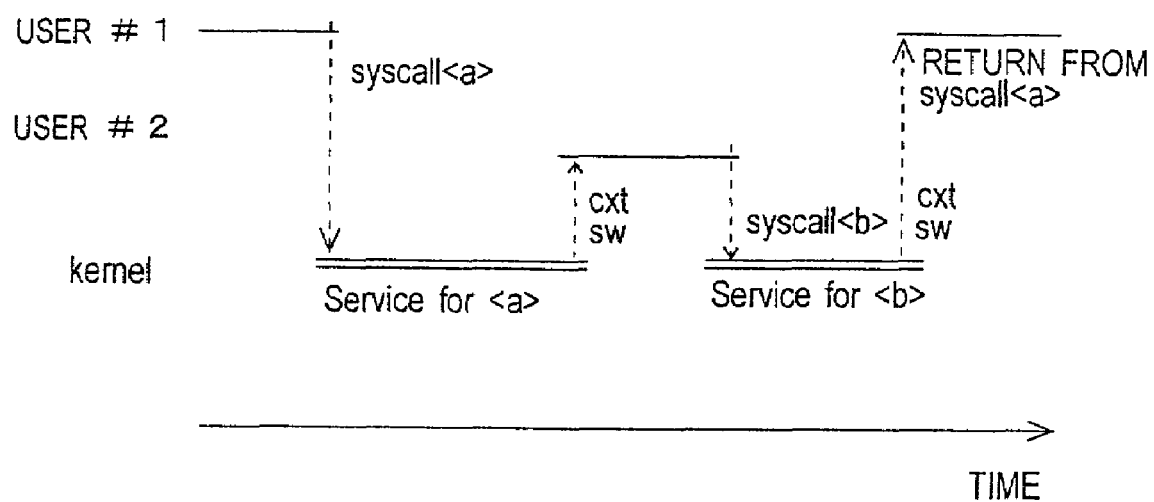
FIG. 5 is a diagram showing the transfer of control between the processes.

As shown in FIG. 3, on the OS 5 as such, a plurality of user programs exist simultaneously, and are seemingly executed simultaneously. In other words, the OS 5 pretends to use the computer resources such as the CPU 1, the memory, the HDD simultaneously, for each user program.

The core of the OS 5 is called the kernel 6. The kernel 6 mainly manages the operation of the computer resources connected thereto, execution of each user program and the like. The kernel 6 is executed in the privileged mode (kernel mode) of the CPU 1. On the contrary, each user program is executed in the non-privileged mode (user mode) of the CPU 1, and the direct operation of each resource is limited. Depending on the kinds of resource and/or operation, more privileged modes may be provided.

An executable unit of each user program is called a user process. Each user process performs acquisition/release of resources such as the memory, and communication with the input/output devices 3 and 4, through the kernel 6. A service request for the kernel 6 is called a system call. In addition, the kernel 6 executes the processes for inputting/outputting or/and interrupts from the external devices, switching control between individual user processes and the like.

The user process actively changes from the user mode to the kernel mode, according to system calls from the user program. This change may also occur with an interrupt from an external device.

The kernel 6 records the execution state of each user process, since it seemingly executes a plurality of user processes in simultaneously. The state during execution (i.e., the state of the CPU register used by the user, of the virtual memory, and the like) is called the "context". Thus, switching of this execution state is called a context switch. In general, a context switch is started by a system call from the user program. At that time, the kernel 6 determining which user process is to be run next is known as scheduling.

As described above, the memory management unit of the CPU 1 has a function for translating a logical address to a physical address, and maps the logical address to be used by the program into the physical address of the memory that actually exists. Further, with the memory protection function, the attributes can be set for each memory area such as whether or not it is executable, writable and so on.

Utilizing this memory management mechanism, the kernel 6 acts as if each of the user processes occupies a user space. That is, each user process operates as if it has an independent user space, and cannot access a user space of an other user process.

However, a problem may occur when the task of the plurality of user processes progress while communicating with each other. Accordingly, the kernel 6 provides a function which allows a portion of the memory space to be shared among each user process. Such space is called a shared memory.

According to the memory management mechanism of the CPU 1, the kernel 6 can shift control to an exception handler, by detecting writing by the user process into a read-only memory, access to a non-existing memory space, and the like. This exception handling is executed within the kernel 6, and in general, the kernel 6 abnormally ends that process.

In the following, a register of the MIPS (Microprocessor without Interlocked Pipe Stage) CPU will be described.

In the present embodiment, as the CPU 1, a MIPS CPU is used. MIPS CPU refers to a RISC-type CPU that has been developed by MIPS Technologies, Inc. The MIPS CPU used in the present invention has a plurality of, for example, 32, general purpose registers. Because of the general purpose registers, there is no register for different uses such as a stack pointer-only register, a memory address-only register, and the like. All of the registers are equivalent in hardware, except that a 0 is always read from a register number 0 (Identifier zero).

However, the method of using each register is set, since there would be a problem for the user if each register cannot be identified when producing software. For example, in the present embodiment, the use of registers 0 to 31 are set as shown in the Table-1.

TABLE 1

Use of Each Register

| Number | Identifier | Use |
| --- | --- | --- |
| 0 | zero | 0 is always read |
| 1 | at | Utilized when a macro instruction is expanded with an assembler |
| 2–3 | v0–v1 | Return value of subroutine |
| 4–7 | a0–a3 | Arguments of subroutine (of four from the beginning) |
| 8–15 | t0–t7 | Temporary resistors (caller save) that is not preserved among the temporary subroutines |
| 24–25 | t8–t9 | ibid |
| 16–23 | s0–s7 | Saved resistors (callee save) that is preserved among the subroutines |
| 26–27 | k0–k1 | Utilized within the exception handling |
| 28 | gp | Global pointer indicates data area |
| 29 | sp | Stack pointer |
| 30 | fp | Frame pointer indicates a frame on the tack |
| 31 | ra | Indicates a return address |

As described above, in the MIPS CPU, the register numbers 26 and 27 (Identifiers k0 and k1) are such that the use thereof is "For use in exception handling". Accordingly, the user can access the registers that are utilized in the exception handling. In other words, they can be seen by this user. Incidentally, although there is a rule in which a portion of the above-mentioned use is changed, nothing has been changed regarding the fact that the register numbers 26 and 27 (Identifiers k0 and k1) can be seen by the user.

Further, the MIPS CPU has a Co-Processor 0 (hereinafter, referred to as "CP0".) for control of the processor itself. When the exception handling occurs, the CPU records cause of exception into a Cause register, and the place where it occurred into an EPC register of the CP0. Within the exception handling, a corresponding process is executed for each cause, with reference to these registers.

In the following, a race condition and a mutual exclusion among the plurality of user processes will be described.

When the plurality of user processes operate by reading/writing in the shared memory, a situation may occur where a final result differs from a result to be obtained originally, depending on who (which user process), when, and how it operates (what process is executed). This state is known as a race condition. Then, a section of the program, which should not be raced originally is called a critical section. In order to control entrance into a critical section, mutual exclusion is required. A variable to be used for determining whether or not mutual exclusion should be executed is called an exclusion variable.

In the following, a simple race condition and a shared variable in which two user processes use one resource will be described with a simple concrete example. For easy of understanding, a case will be considered in which two people use one fitting room.

Here, two people, person A and person B, represent the processes A and B, respectively, and one fitting room represents the shared memory. Since it is troublesome if two people use the fitting room simultaneously (i.e., if the race condition occurs), the use of the fitting room by persons A and B becomes the critical section. In order to make the use of the fitting room be mutually exclusive, it is necessary to provide a display tag to indicated "empty/occupied". Accordingly, this display tag becomes an exclusive variable.

Two people enter into the fitting room by the following procedure. It is assumed that persons A and B execute their actions alternately for each step in the procedure, as indicated in the following Table-2.

TABLE 2

Occurrence of Race Condition

| Point In Time | Procedures for person A | Procedures for person B |
|---|---|---|
| 1 | Look at the display tag | |
| 2 | | Look at the display tag |
| 3 | <"Empty">? yes | |
| 4 | | <"Empty">? yes |
| 5 | Change the display tag from empty to occupied | |
| 6 | | Change the display tag from empty to occupied |
| 7 | Use the fitting room | |
| 8 | | Use the fitting room |

As can be seen from Table-2, at the point in time 8, a state where two people would enter the fitting room, i.e., the race condition, occurs.

Here, if the procedures (processes) from "looking at the display tag" to "changing the display tag from empty to occupied" are executed in atomicity (inseparable relationship), no race condition occurs, and thus there is no problem. However, if they are not executed in atomicity manner, then the race condition problem occurs. Incidentally, herein, atomicity process represents a group of processes to be executed together, and it indicates that if an abnormality, an interrupt, etc. occurs during execution of the group of processes, then the process results would be destroyed or saved.

In the CPU 1, there are many cases where the instructions for atomicityally (inseparable relationship) processing the procedures from "looking at the display tag" to "changing the display tag from empty to occupied" are prepared. Such an instruction is called a test-and-set instruction.

In Linux (that is one of the OS, which is a kind of UNIX), a system call clone( ) is provided. This system call modifies the traditional system call fork( ) so as to share a process space. In general, in the glibc (core library developed by FSF) that is used in the Linux system, there is provided an implementation of thread (a small module that can be activated from a task during operation) in which this system call is used (hereinafter, this implementation is referred to as a "Linux-thread"). For an efficient implementation of the mutual exclusion between the threads, an implementation of an efficient test-and-set instruction at the user process level is required. For this purpose, these are provided as the instructions of the CPU 1 in general.

Now, a more concrete description will be given. In general, in the MIPS architecture which is greater than or equal to MIPS 2 ISA (Instruction Set Architecture), for the atomicity test-and-set instruction, a ll/sc (load-linked/store-conditional) instruction is provided. This has a mechanism for remembering an address when loaded by the ll (load-linked) instruction, and during a period of time until executing the sc (store-conditional) instruction, if another CPU 1 executed a writing into this vicinity, or, if the exception handling occurred, then no writing is executed with the sc instruction. In the single-processor system, it can be said that this ll/sc instruction is inseparable from the implementation of a safe test-and-set instruction on operating systems such as Linux.

However, in the MIPS 1 ISA, a dedicated instruction as such is not prepared. Further, among the CPUs of the MIPS architecture, that are designed for embedded use, there are some that do not have this instruction. The ll/sc instruction is omitted in the CPU known as the Emotion Engine (hereinafter, referred to as "EE") made by the SCEI (Sony Computer Entertainment, Inc.) that is the assignee of the present application, as well as the Vr 4100 and the like. Accordingly, in these CPUs, using some kind of means, there will be a need to avoid the generation of a race condition.

In the following, the EE, Vr 4100, and the MIPS 1 will be briefly described.

(1) In the Vr 4100, no dedicated instruction such as the ll/sc instruction is provided. Accordingly, atomicity is not secured, and the plurality of user processes enter into the critical section simultaneously, and thus the race condition occurs (refer to FIGS. 10 and 11).

(2) EE Example

In the EE, the ll/sc instruction is not prepared, but ei/di instruction is provided instead. The ei/di instruction is an instruction for inhibiting/permitting interrupts, and enables atomicity of the test-and-set instructions to be secured, if being used at the entrance/exit of the critical section (refer to FIG. 12).

However, if these executions were permitted at the user level, anyone could simply execute a program for stopping the whole system. That is, in the ei/di instruction, exclusive control cannot be executed safely. As a result, the ei/di instruction cannot actually be used in the protected user environments such as Linux (refer to FIG. 13).

(3) MIPS 1 ISA

Originally, the ll/sc instruction was not provided in the MIPS 1 ISA. As the implementation of the mutual exclusion for use in the MIPS 1 ISA, there are:

(a) test-and-set instructions implemented by the system calls; and (b) the Lamport algorithm implementation.

However, there is a significant problem regarding performance in that the exception handling and context switching always occur, even in the case where there is no racing, when using (a) the test-and-set instruction according to the system call. Refer to an overhead that is described later.

On the other hand, in order to implement the Lamport algorithm (b), the following problem occurs (refer to FIG. 14).

In order to implement the variable b[i] representing the states of the user processes to be executed simultaneously, a memory that is shared by all concurrent user processes is required. Even for user processes that do not enter the critical sections, the variable b[i] must be correctly cleared at the end. In the implementation distributed by the MIPS ABI group, although it is arranged to activate a daemon for this supervision, it is impossible to determine abnormal termination in principle, and it turns out that a substantial amount of time is consumed for the detection.

Further, if attempting to allocate an area of the variable b[i] dynamically, on the user process side, it is shown that another restriction is formed other than the restrictions on the process and the number of threads possessed by the OS (Operating System) originally.

Considering the efficient utilization of the memory area, the shared variable b[i] in the processes such as mmap( ) and shmget( ) may occupy a single area. However, in doing so, it turns out that anyone can rewrite the variable b[i] for other processes. At any rate, it is shown that the wait for a completely independent exclusive variable can be interfered with.

In order to operate the variable b [i] safely, from each process as read-only, rewriting by using the kernel could be considered, but in doing so, an overhead that is similar to the one for the implementation according to the system calls may occur.

In the implementation distributed by the MIPS ABI group, the shared memory function of the SYSV IPC is utilized to allocate the areas x, y, and b[i], for ensuring access restrictions. However, in this shared memory, it is shown that the supervision for abnormal termination by the daemon is required, since there is a problem in that the shared memory segment has to be removed explicitly at the end.

Further, in the default, assuming the value obtained with the geteuid( ) as a key, and since access is also limited to its own uid, sharing of the intended exclusive variable is also limited in this range. This proves that if it is desirable to execute sharing beyond that range, setting of the environmental variables is required separately, and thus it lacks versatility.

In order to solve these problems, the present invention provides a function that is generalized and has few limitations, and that is required for an implementation of the Linux threads. In this case, a mechanism of the test-and-set instruction is implemented racing to greatly minimize the overhead when no racing occurs, and without reducing the stability of the system and without the security hole are set to the target.

In a single-processor system, the present invention makes possible a safe user level exclusive control that does not require a dedicated CPU instruction, by utilizing the OS memory protection function and the kernel work registers.

For example, because the instruction ll/sc is not provided in the EE, the test-and-set instruction that does not require a system call is implemented by utilizing the registers for kernel work and the memory protection mechanism provided by the kernel. This implementation can be utilized in another single processor MIPS architecture CPU, which does not have the ll/sc instruction.

Since the subject of the present invention is a single-processor system, if an operation currently in progress is not interrupted by another user process, then atomicity at the user process level of that operation can be guaranteed.

Guaranteeing the atomicity of the operation indicates that:
(1) For a series of operations in a certain interval, it is guaranteed that they are capable of being implemented without any interruption from other user programs; or (2) Even if they are interrupted from another user program, the interruption can be detected and a makeup is executed by canceling the series of operations in a certain interval. That is, the interrupt detection from another user process and the cancellation of the operation need to be in the atomicity state.

In the present invention, (2) even if they are interrupted from another user program, the interruption can be detected and a makeup is executed by canceling the series of operations in a certain interval.

Fortunately, in MIPS, since the kernel work register can also be seen by the user, in the present invention, by utilizing these registers and the memory protection function provided by the kernel, with a series of "detections and cancellations", the required atomicity can be implemented.

In the following, the implementation of the atomicity according to the detection and cancellation will be described.

Figure 6:
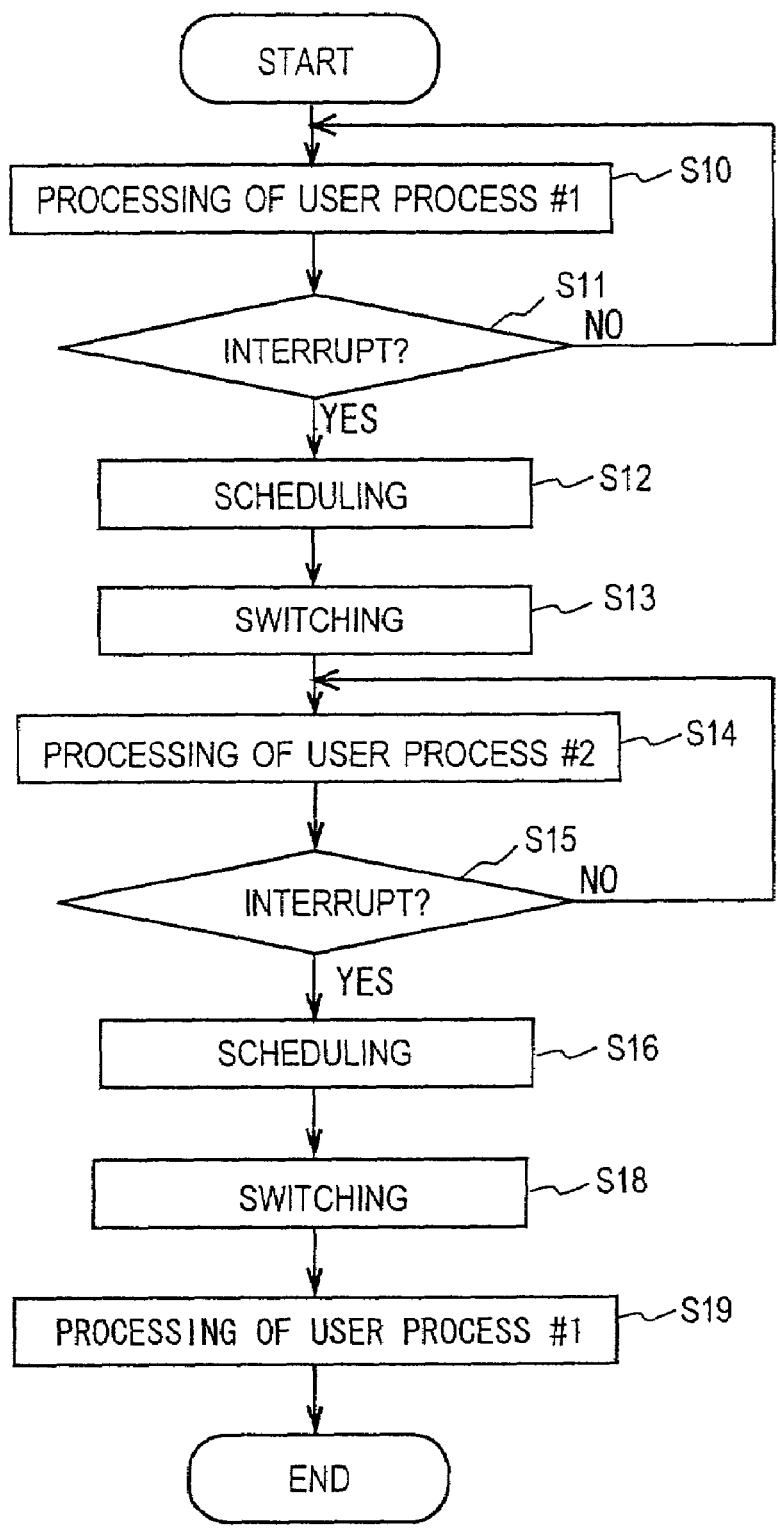
FIG. 6 is a flowchart of multitasking processes in a single processor.
Figure 7:
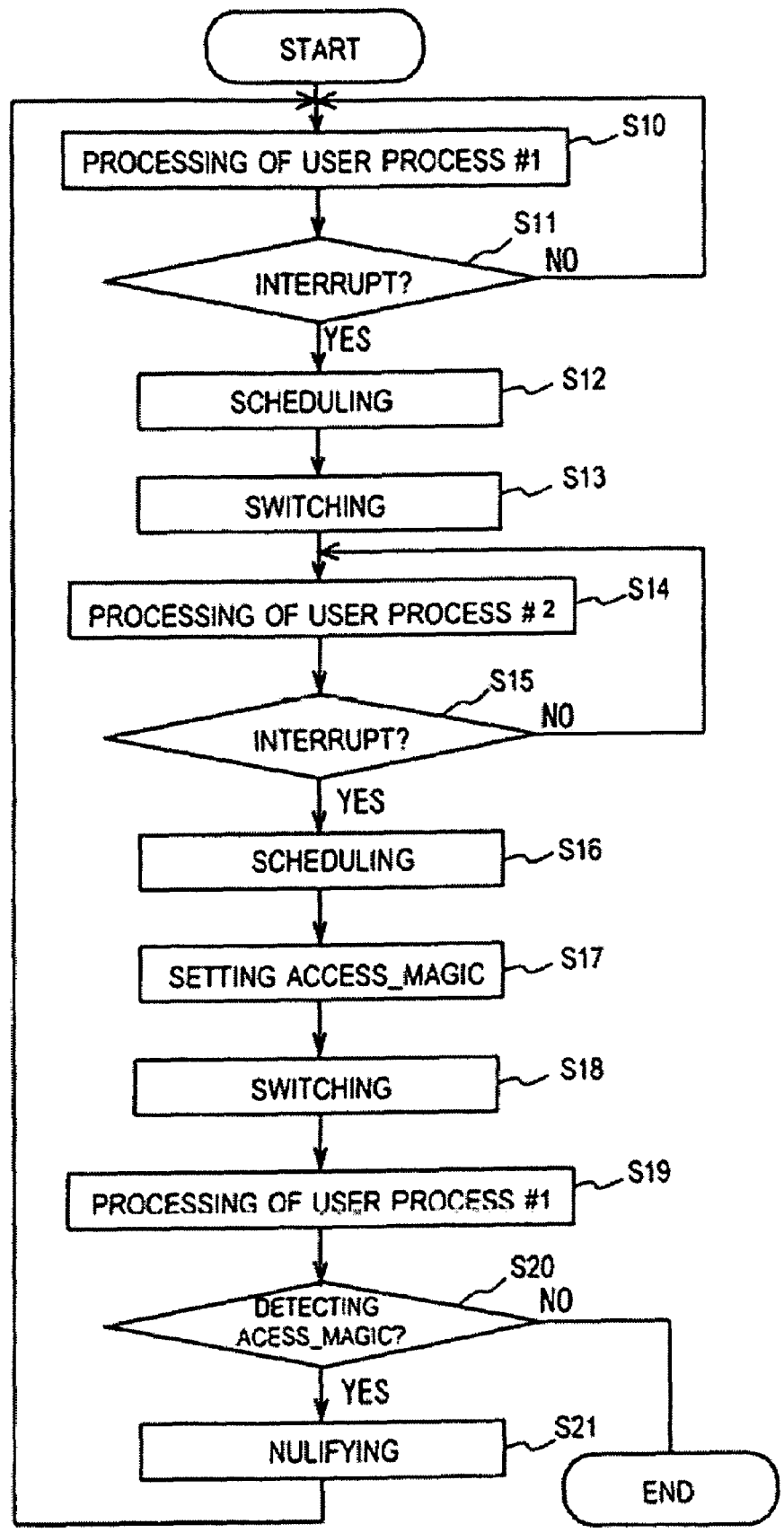
FIG. 7 is a flowchart of multitasking processes in a single processor.

FIG. 6 is a flowchart for illustrating multitasking processes in a conventional single processor in which there is no series of "detection and cancellation" processes, in order that the present invention can be easily understood. FIG. 7 is a flowchart for illustrating multitasking processes by a single processor of the present invention, according to a series of "detection and cancellation" processes.

As shown in FIG. 7, in step S10, the user process #1 is executed. In step S11, it is determined whether or not there is an interrupt request from the user process #2. In the case that where there is an interrupt request, in step S12, the kernel executes scheduling, and then it is determined which user process should be executed.

If the execution of the user process #2 is selected, then in step S13, a switch (context switch) is performed by the kernel, and in step S14, the user process 2 is executed.

In step S15, it is determined whether or not there is an interrupt request from the user process #1. In the case where there is an interrupt request, then in step S16, the kernel performs scheduling, and it is determined which user process is to be executed next.

In step S17, a constant ACCESS_MAGIC is set in the kernel work registers, and then if execution of the user process #1 is selected in the previous step, in step S18, a switch (context switch) is performed by the kernel, and in step S19, the user process #1 is executed.

In step S20, it is detected whether or not there is the constant ACCESS_MAGIC, and if there is, the series of processes that require atomicity are cancelled, and then the flow returns to step S10, and the user process #1 is executed again.

On the contrary, in the multitask processing in the conventional single processor in FIG. 6 in which there is no "detection and cancellation" process in FIG. 6, there are no steps S17, S20 and S21 shown in FIG. 7, and the setting of the constant ACCESS_MAGIC, the detection, and the cancellation of the processes are not performed. Accordingly, the process result of the user process #1 executed in step S10 and the process result of the user process #2 executed in step S14 are cause racing, and as a result, a problem may occur in the user process #1 that is executed in step S19.

In the following, the above described situation will be illustrated in a practical algorithm.

At first, the test-and-set "tst" that is required in the Linux thread of the glibc (the basic library of the OS developed by the FSF (Free Software Foundation)) is prepared. This test-and-set instruction "tst" performs the following tasks.

If the contents of the address given by the argument (addr) is 0 (zero), then it is replaced with 1 (one). The return value is the contents of the original address. The library utilizes, as an indicator having a value 1 of the exclusive variable being used, while (tst(mutex_var));
    critical section
    mutex_var=0;

By detecting an interrupt within this procedure, if the interrupt occurs, then writing into the mutex var is cancelled. For this cancellation, the kernel work register k1 is used. When transiting control from the kernel to the user program, the specific value (constant) ACCESS_MAGIC is always set to k1. This value should be determined in such a manner that if the user program accesses an address of this ACCESS_MAGIC, then an access violation interrupt (segmentation violation) of a invalid address space is generated by utilizing the memory protection function.

FIG. 8 shows an example of which the user program 1 executing the test-and-set instruction in a single processor having a multi-processing execution function. In this program, if a race condition occurs, then a problem occurs in storing sequence (li, t0,1) . Accordingly, it is necessary to guarantee the atomicity of the series of processes from the sequence (a) to (b).

In the access violation exception (segmentation violation) of the cancelled address space according to the kernel, if an access violation to the ACCESS_MAGIC address in the procedure of the test-and-set instruction is detected, control is returned to the start of this procedure. In doing so, if there is an interrupt in the sequence (a) to (b), and the contents of the addr has been changed from 0 to 1, the test-and-set instruction "tst" is repeated. This state will be described in the following with reference to FIG. 9.

Figure 9:
FIG. 9 is a sequence diagram of an interrupt in atomicity area.

In FIG. 9, on the left half thereof (FIG. 9 (a)) the sequence (UserProc #1) of the user program 1 illustrated in FIG. 8 is described. On the right half thereof, the sequence (UserProc #2) of another user program, which has a possibility of a race condition occurring during execution of the user program 1 is described. In-between these (in the center part), the sequence of the preemptive scheduling which the kernel of the OS (Operating System) executes is described.

The mutex_addr is written into the address a0, with a sequence (//a0 holds mutex_addr) of the user program 1.

In order to execute a sequence of another user program, the process is switched (context sw), with a timer interrupt (timer intr.).

However, there is a possibility that the contents mutex_addr written into the address a0 is modified during the execution of the sequence of another user program.

Again, in order to execute the sequence of the user program 1, the process is switched (context sw) with the timer interrupt (timer intr.).

At this moment, the kernel writes the constant ACCESS_MAGIC into the register k1 (li ki, ACCESS_MAGIC).

The process is switched (context sw), and then the SW is executed from the sequence NOP.

However, thereafter, by using the kernel, the constant ACCESS_MAGIC is detected (confirm writing to ACCESS_MAGIC), and then the cancellation (set restart addr to tst( )) is executed.

As described above, by executing the sequence of the user program 1, which has been executed up to the middle, again, as a result, the atomicity of the series of processes of the sequences (a) to (b) in FIG. 8 is guaranteed.

If another process changes the value from 0 (zero) to 1 (one) during the sequences (a) to (b), conventionally, replacement of a variable value is possible, but in this algorithm, no replacement occurs. In addition, as a result thereof, no unwanted entering into the critical session occurs.

Now, the overhead will be discussed.

Figure 15:
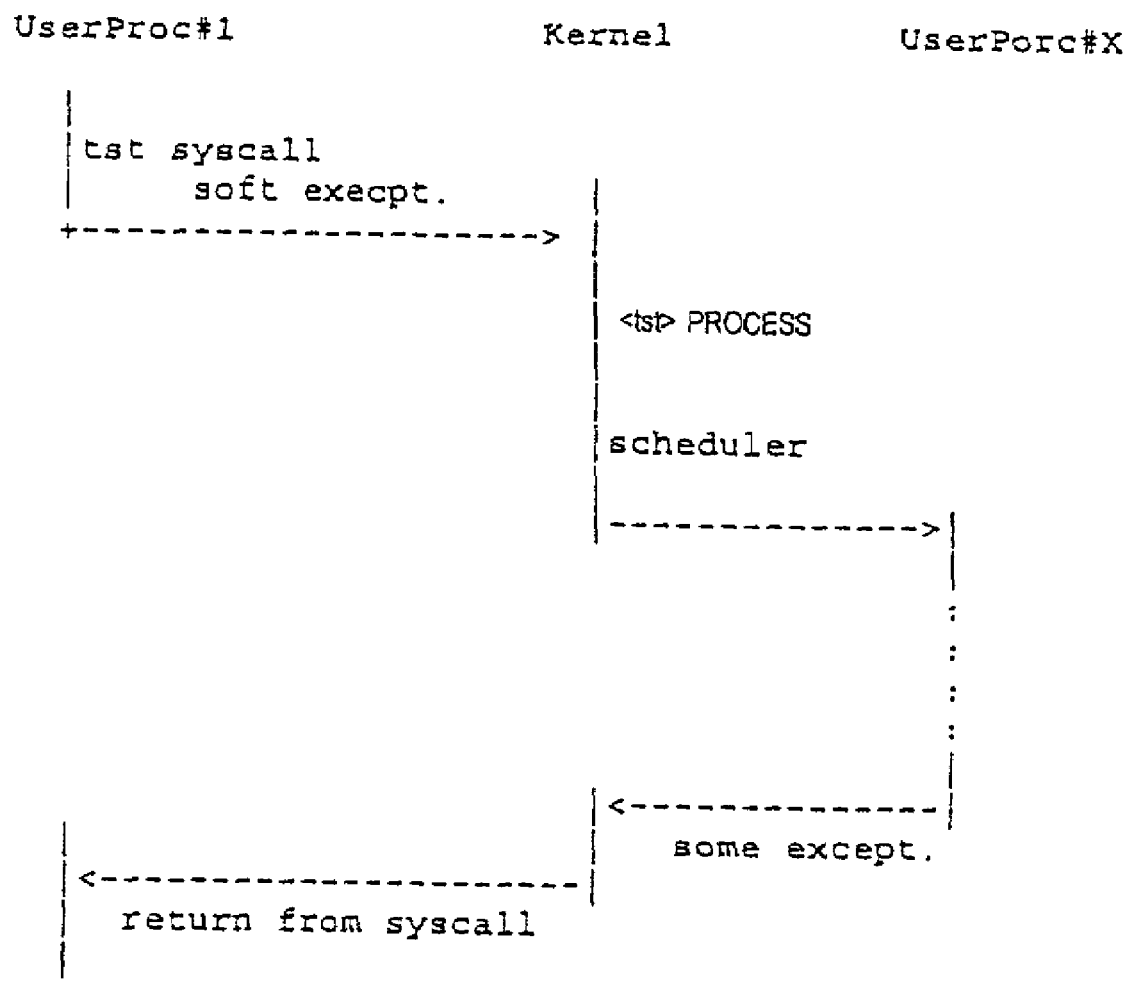
FIG. 15 is a sequence diagram showing an implementation according to a system call.

If implementing the test-and-set instruction with a system call, even when no race condition occurs, a context switching should always occur (refer to FIG. 15).

On one hand, with the implementation method at this time, if no race condition occurs, the test-and-set instruction "tst" procedure is simply executed at the user level, and thus no context switching occurs.

Figure 16:
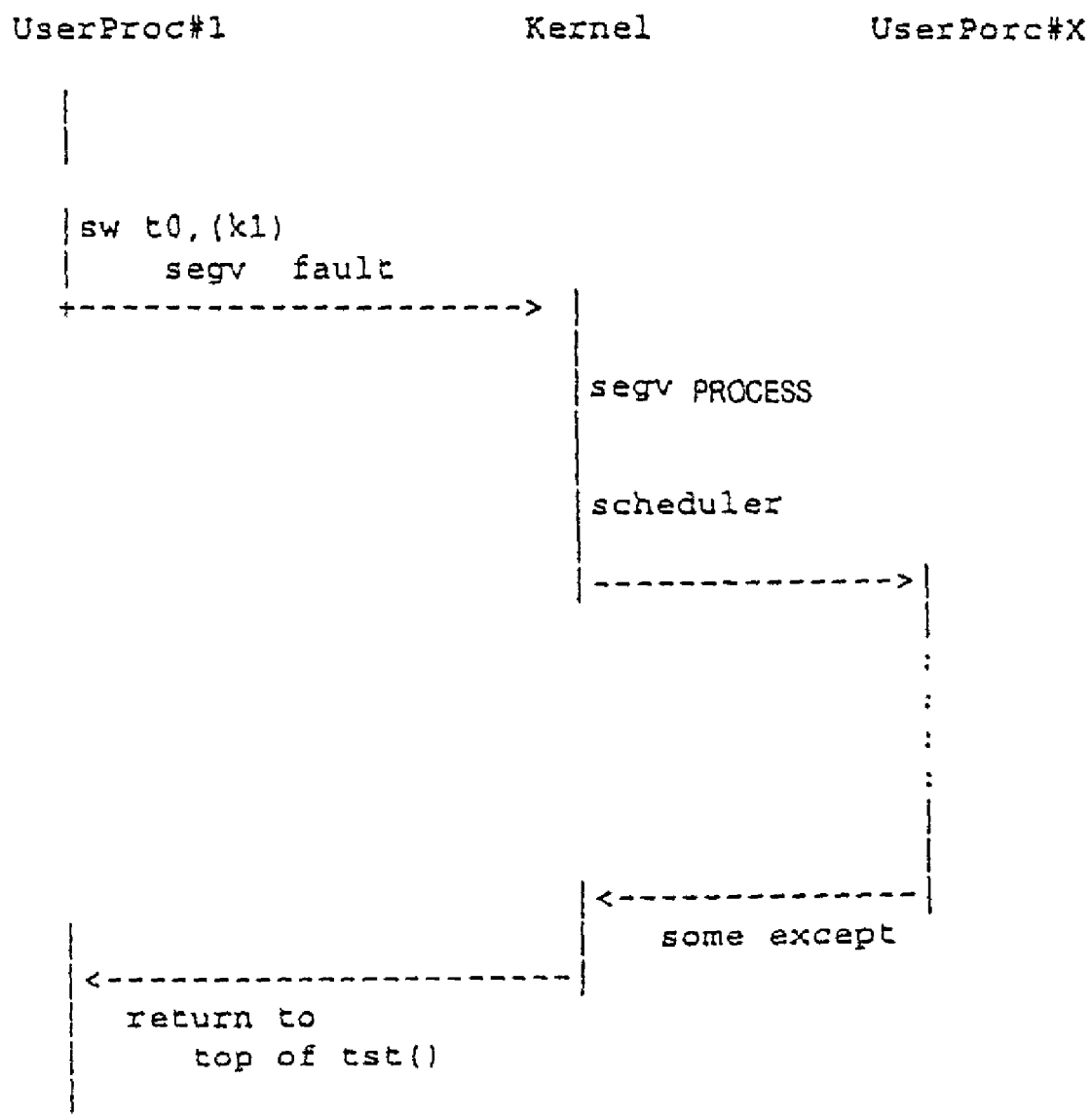
FIG. 16 is a sequence diagram in case of contention.

If it were in the race condition, access violation interrupt (Segmentation Violation) within the cancelled address space occurs. The cost in this case is not substantially different from that of implementing it by a system call (refer to FIG. 16).

In general, since it is very rarely in the race condition, performance is substantially improved compared to the implementation by a system call.

The assignee of the present application has developed the Playstation 2 as an entertainment system. In this entertainment system, the CPU called an EE (Emotion Engine) is adopted. A software device driver such as "/dev/tst", which provides Linux that is ported for use in the EE with the procedures of the shared test-and-set instruction, is implemented.

A support routine of the Linux thread of the glibc invokes (calls) the procedures of the test-and-set instruction by executing this device with "open", "mmap", and "close". As a consequence, once initialized, the system call for invoking the procedures of the test-and-set instruction is no longer necessary.

Further, since the "mmap" is being utilized at a time when abnormally ending, there is no case where an unwanted resource still remains.

The tst procedure(s) to be "mmap"ed is improved as the k1 is tested before the sw execution to minimize context switch frequency, even if it is in the race condition (refer to FIG. 17).

In view of maintainability when updating, it is arranged that if executing with "open", and "read", then the address to be used with "mmap" can be read. The library "mmap"s to that address with the MAP_FIXED for one page, and invokes the "mmap"ed destination instead of the test-and-set instruction of the system call.

In the following, the advantages of the above described embodiments will be illustrated.

With the EE version of Linux on a machine for use in performance evaluation, the following are evaluated.

(1) The speed difference in a case where no race occurs
(2) The difference in the number of processes to be completed within a certain period of time in a case where a race occurs as well For the measurement of (1), an evaluation program 1 that simply calls the posix (Portable Operating System Interface) 1003.1b semaphore repeatedly is made, and a comparison is made with the test-and-set instruction of the system call version and the present embodiment. Measurement is performed three-times in the state when no other process is active, and the average value is used (refer to FIG. 18).

Since the system call is not used, the processing rate in the state when no other process is active is increased by about 4.8 times.

For the measurement of (2), by implementing (the evaluation program 2) a typical supply-demand problem by using the POSIX 1003.1b semaphore, the number of processes of the resources (the number of supply-demand) within a constant period of time is compared with the test-and-set instruction of the system call version and the present embodiment. Each measurement of 20 seconds is repeated ten-times for one state, and the average value is used (refer to the reference FIGS. 19 to 23(10)).

Depending on the number of threads, the number of processes has been enhanced by about 1.3 times to 1.7 times.

Since the overhead is reduced according to the present embodiment, the number of processes has been improved regardless of the number of threads. If it turns out to be a state such that the load on the whole system becomes larger as the number of threads increase, then the advantages of the present invention will be more pronounced.

As described above, in the present embodiment, by implementing the test-and-set instruction without using a system call, it is possible to reduce the overhead and to improve a single process rate by 4 times or more and the number of processes within a certain period of time by 30% or more.

As described above, the advantages of the present invention are as follows.

According to the present invention, in a single-processor system for processing multiple jobs, it is possible to provide a novel computer for efficiently and safely executing an exclusive control at the user process level, without any dedicated instruction, a method of controlling the computer, and a recording medium onto which the method of controlling the computer is recorded.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The invention claimed is:

1. A computer in which a plurality of programs, each including at least one user process, are executed by a single processor, the computer comprising:
   an operating system operable to manage the single processor;
   means for executing first and second user processes;
   means for detecting requests to interrupt the first and second user processes;
   means for switching context between the first and second user processes in response to a selected interrupt request;
   memory employed for storing data during execution of the first and second user processes;
   a memory management mechanism included in the operating system; and
   means for ensuring atomicity of the first user process, including:
      a memory protection function included in the memory management mechanism for controlling access to the memory;
      a predetermined register;
      means for initiating execution of the first user process, wherein the means for switching context is operable to switch the context from the first user process to the second user process in response to the selected interrupt request;
      means for overwriting an invalid address in the predetermined register in response to a further interrupt request to switch the context back to a re-execution of the first user process, the memory protection function being responsive to detection of the invalid address for preventing the first user process from being active; and
      means for returning processing of the first user process to the means for initiation execution, whereby atomicity of the first user process may be ensured.

2. A computer according to claim 1, wherein the operating system comprises a kernel that includes the means for detecting the interrupt requests and the means for switching context.

3. A computer according to claim 1, wherein the memory protection function comprises:
   means for temporarily writing an address of the first user process into the predetermined register; and
   means for rewriting the contents of the predetermined register with the invalid address in response to the interrupt request to switch context back to the first user process.

4. A computer according to claim 3, wherein the memory protection function further comprises means for setting an error indication in the predetermined register in relation to the first user process when the invalid address is detected.

5. A computer according to claim 3, wherein the predetermined register is a kernel work register.

6. A computer according to claim 5, further comprising a CPU in which the kernel work register also can be utilized by the first and second user processes.

7. A method for controlling a computer in which a plurality of programs, each including at least one user process, are executed by a single processor under management of an operating system, the method comprising:
   executing first and second user processes;
   detecting requests to interrupt the first and second user processes;
   switching context between the first and second user processes in response to a selected interrupt request;
   storing data in a memory during execution of the first and second user processes;
   managing employment of the memory; and
   ensuring atomicity of the first user process by:
   controlling access to the memory using a memory protection function;
   initiating execution of the first user process, wherein the switching step switches the context from the first user process to the second user process in response to the selected interrupt request;
   overwriting an invalid address in a predetermined register in response to a further interrupt request to switch the context back to a re-execution of the first user process;
   ignoring the re-execution of the first user process in response to detection of the invalid address using the memory protection function; and
   returning processing to initiating execution of the first user process, whereby atomicity of the first user process may be ensured.

8. A method of controlling a computer according to claim 7, wherein the step of detecting the interrupt requests is performed by a kernel of the operating system.

9. A method of controlling a computer according to claim 8, wherein the predetermined register is a kernel work register.

10. A method of controlling a computer according to claim 9, wherein the computer comprises a CPU in which the kernel work register also can be utilized by the first and second user processes.

11. A method of controlling a computer according to claim 7, wherein the ignoring step comprises:

temporarily writing the first user process into the predetermined register; and rewriting the contents of the predetermined register to the invalid address in response to the interrupt request to switch the context back to the first user process.

12. A method of controlling a computer according to claim 11, wherein the ignoring step further comprises setting an error indication in relation to the first user process when the invalid address is detected.

13. A recording medium recorded with a first program for controlling a computer in which a plurality of programs, each including at least one user process, are executed by a single processor under management of an operating system, the first program performing the steps of:

executing first and second user processes;

detecting requests to interrupt the first and second user processes;

switching context between the first and second user processes in response to a selected interrupt request;

storing data in a memory during execution of the first and second user processes;

managing employment of the memory; and ensuring atomicity of the first user process by:

controlling access to the memory using a memory protection function;

initiating execution of the first user process, wherein the switching step switches the context from the first user process to the second user process in response to the selected interrupt request;

overwriting an invalid address in a predetermined register in response to a further interrupt request to switch the context back to a re-execution of the first user process;

ignoring the re-execution of the first user process in response to detection of the invalid address using the memory protection function; and returning processing to initiating execution of the first user process, whereby atomicity of the first user process may be ensured.

14. A recording medium according to claim 13, wherein the step of detecting the interrupt requests is performed by a kernel of the operating system.

15. A recording medium according to claim 14, wherein the predetermined register is a kernel work register.

16. A recording medium according to claim 15, wherein the computer comprises a CPU in which the kernel work register can be also utilized by the first and second user processes.

17. A recording medium according to claim 13, wherein the ignoring step comprises:

temporarily writing the first user process into the predetermined register; and rewriting the contents of the predetermined register to the invalid address in response to the interrupt request to switch the context back to the first user process.

18. A recording medium according to claim 17, wherein the ignoring step further comprises setting an error indication in relation to the first user process when the invalid address is detected.

* * * * *

UNITED STATES PATENT AND TRADEMARK OFFICE
CERTIFICATE OF CORRECTION

PATENT NO.        : 7,096,472 B2                                              Page 1 of 1
APPLICATION NO. : 09/948417
DATED             : August 22, 2006
INVENTOR(S)       : Hiroyuki Machida and Takao Shinohara It is certified that error appears in the above-identified patent and that said Letters Patent is hereby corrected as shown below:

At Column 10, line 34, "process 2" should read -- process #2 --.
At Column 11, line 8, "mutex var" should read -- mutex_var" --.

Signed and Sealed this

Fifteenth Day of May, 2007

JON W. DUDAS
*Director of the United States Patent and Trademark Office*